(12) United States Patent
Okada et al.

(10) Patent No.: US 10,908,672 B2
(45) Date of Patent: Feb. 2, 2021

(54) INFORMATION PROCESSING DEVICE EQUIPPED WITH OPERATING SYSTEM

(71) Applicant: CASIO COMPUTER CO., LTD., Tokyo (JP)

(72) Inventors: Takeshi Okada, Tokyo (JP); Hiroyuki Kato, Chiba (JP); Keiichi Imamura, Tokyo (JP); Kayo Okada, Tokyo (JP); Masaru Sakata, Tokyo (JP); Kousuke Ishizaki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 233 days.

(21) Appl. No.: 15/269,544

(22) Filed: Sep. 19, 2016

(65) Prior Publication Data

US 2017/0177067 A1 Jun. 22, 2017

(30) Foreign Application Priority Data

Dec. 22, 2015 (JP) .................................. 2015-250436

(51) Int. Cl.
*G06F 1/3293* (2019.01)
*G06F 1/3212* (2019.01)
(Continued)

(52) U.S. Cl.
CPC .......... *G06F 1/3293* (2013.01); *G06F 1/3212* (2013.01); *G06F 1/3287* (2013.01);
(Continued)

(58) Field of Classification Search
None
See application file for complete search history.

(56) References Cited

U.S. PATENT DOCUMENTS 7,080,379 B2 * 7/2006 Brenner .................. G06F 9/505
                                                                718/100
7,120,266 B2 * 10/2006 Iwasa ...................... G06F 1/163
                                                                381/333

(Continued)

FOREIGN PATENT DOCUMENTS

CN        103760982 A     4/2014
JP          57079984 A     5/1982
(Continued)

OTHER PUBLICATIONS

Japanese Office Action dated Feb. 6, 2018 issued in counterpart Japanese Application No. 2015-250436.

(Continued)

*Primary Examiner* — Paul Yen
(74) *Attorney, Agent, or Firm* — Holtz, Holtz & Volek PC (57) ABSTRACT

An information processing device includes a state determination unit. The state determination unit switches between first execution processing that executes a function of the information processing device by way of an operating system, and second execution processing that stops operation of the operating system during operation, and executes a specific function of the information processing device by way of a specific program without turning ON a power source of the information processing device. The second execution processing is not performed during execution of the first execution processing.

20 Claims, 5 Drawing Sheets

(51) Int. Cl.
*G06F 1/3287* (2019.01)
*G06F 1/3296* (2019.01)
*H04B 1/3827* (2015.01)
*G06F 1/16* (2006.01)
*G06F 1/14* (2006.01)

(52) U.S. Cl.
CPC ........... *G06F 1/3296* (2013.01); *H04B 1/385* (2013.01); *G06F 1/14* (2013.01); *G06F 1/163* (2013.01); *Y02D 10/00* (2018.01)

(56) References Cited

U.S. PATENT DOCUMENTS

| | | | |
|---|---|---|---|
| 7,593,755 B2 | 9/2009 | Colando et al. | |
| 9,009,516 B1* | 4/2015 | Gabayan | G06F 1/3206 713/323 |
| 9,846,453 B2 | 12/2017 | Matsumto | |
| 2008/0004012 A1* | 1/2008 | Polzin | G06F 1/1616 455/435.1 |
| 2008/0005527 A1* | 1/2008 | Bang | G06F 9/441 711/202 |
| 2011/0175902 A1* | 7/2011 | Mahowald | H04N 13/395 345/419 |
| 2014/0184530 A1* | 7/2014 | Hyun | G06F 1/1626 345/173 |
| 2014/0281607 A1* | 9/2014 | Tse | G06F 1/3287 713/320 |
| 2015/0067580 A1* | 3/2015 | Um | G06F 3/048 715/781 |
| 2015/0286246 A1 | 10/2015 | Matsumoto | |
| 2017/0075316 A1* | 3/2017 | Berdinis | G04G 19/06 |

FOREIGN PATENT DOCUMENTS

| | | |
|---|---|---|
| JP | 11249754 A | 9/1999 |
| JP | 2005328488 A | 11/2005 |
| JP | 2006101505 A | 4/2006 |
| JP | 2008102660 A | 5/2008 |
| JP | 2013003873 A | 1/2013 |
| JP | 2015207271 A | 11/2015 |

OTHER PUBLICATIONS

Japanese Office Action dated Jul. 30, 2019 (and English translation thereof) issued in Japanese Application No. 2018-092115.
Chinese Office Action (and English language translation thereof) dated Mar. 13, 2020 issued in Chinese Application No. 201610939864.9.

* cited by examiner

INFORMATION PROCESSING DEVICE EQUIPPED WITH OPERATING SYSTEM

This application claims the benefit of priority of Japanese Patent Application No. 2015-250436 filed on Dec. 22, 2015, the entire disclosure of which is incorporated herein by reference in its entirety.

FIELD OF THE INVENTION

The present invention relates to an information processing device equipped with an operating system.

BACKGROUND OF THE INVENTION

Conventionally, a wearable information processing device called a smart watch or the like has been known.

Smart watch is configured as the form of a wristwatch, for example, and includes functions similar to a smartphone.

Therefore, by way of a smart watch, a user can confirm the contents of e-mails as with a smartphone, and can confirm the time as with a wristwatch.

It should be noted that technology related to a smart watch is disclosed in Japanese Unexamined Patent Application, Publication No. 2006-101505, for example.

SUMMARY OF THE INVENTION

According to an aspect of the present invention,
an information processing device for executing:
first execution processing of executing a function of the information processing device by way of an operating system; second execution processing of stopping operation of the operating system during operation, and executing a specific function of the information processing device by way of a specific program without turning ON a power source of the information processing device; and switching processing of switching between the first execution processing and the second execution processing,
wherein the second execution processing is not performed during execution of the first execution processing.

DETAILED DESCRIPTION OF THE INVENTION

Hereinafter, an embodiment of the present invention will be explained using the drawings.

An information processing device according to the present embodiment is configured as a wearable information processing device such as a smart watch. In addition, the information processing device includes a first Central Processing Unit (hereinafter referred to as CPU), and second CPU, and executes the processing of an operating system (hereinafter referred to as OS), which is first execution processing, by way of the first CPU, and executes the processing of a specific program (e.g., program not requiring OS management; another OS; etc.), which is second execution processing, by way of the second CPU. It should be noted that the second execution processing is not performed by the second CPU, during execution of the first execution processing (OS processing) by the first CPU.

Then, the information processing device is able to continue operation of the specific program in the second CPU without turning the power source of the information processing device ON again, in a state stopping operation of the OS in the first CPU (shutdown, etc.).

In other words, in a state stopping the operation of the OS in the first CPU (shutdown, etc.) possessed by the information processing device according to the present embodiment, the functions that can continue the operation of the specific program in the second CPU without turning ON the power source of this information processing device are entirely different from the function of a personal computer or the like switching the OS to boot up by way of a boot selector while starting up the power source.

In order to make such operation possible, hardware controllable by the first CPU, hardware controllable by the second CPU, and hardware controllable by the first CPU and second CPU are established in advance in the information processing device. In the example shown in the present embodiment, the information processing device includes a first display part and second display part that are layer stacked, and can control the first display part by way of the first CPU, and can control the second display part by way of the second CPU even in a state in which OS operation of the first CPU has been stopped. In addition, in a state in which OS operation in the first CPU has been stopped, since control of the second display part in the second CPU is made possible, the hardware such as Read Only Memory (hereinafter called ROM) and Random Access Memory (hereinafter called RAM) is controllable from either of the first CPU and second CPU.

According to such a configuration, functions similar to a smartphone can be realized by execution of programs by the first CPU, and functions of a wristwatch can be realized by execution of programs by the second CPU. Then, by stopping operation of the OS by the first CPU, it is possible to reduce the power consumption due to the functions similar to a smartphone, and allow only the functions of a wristwatch to operate.

Therefore, it is possible to make the information processing device lower power consumption.

(Configuration)

Figure 1:
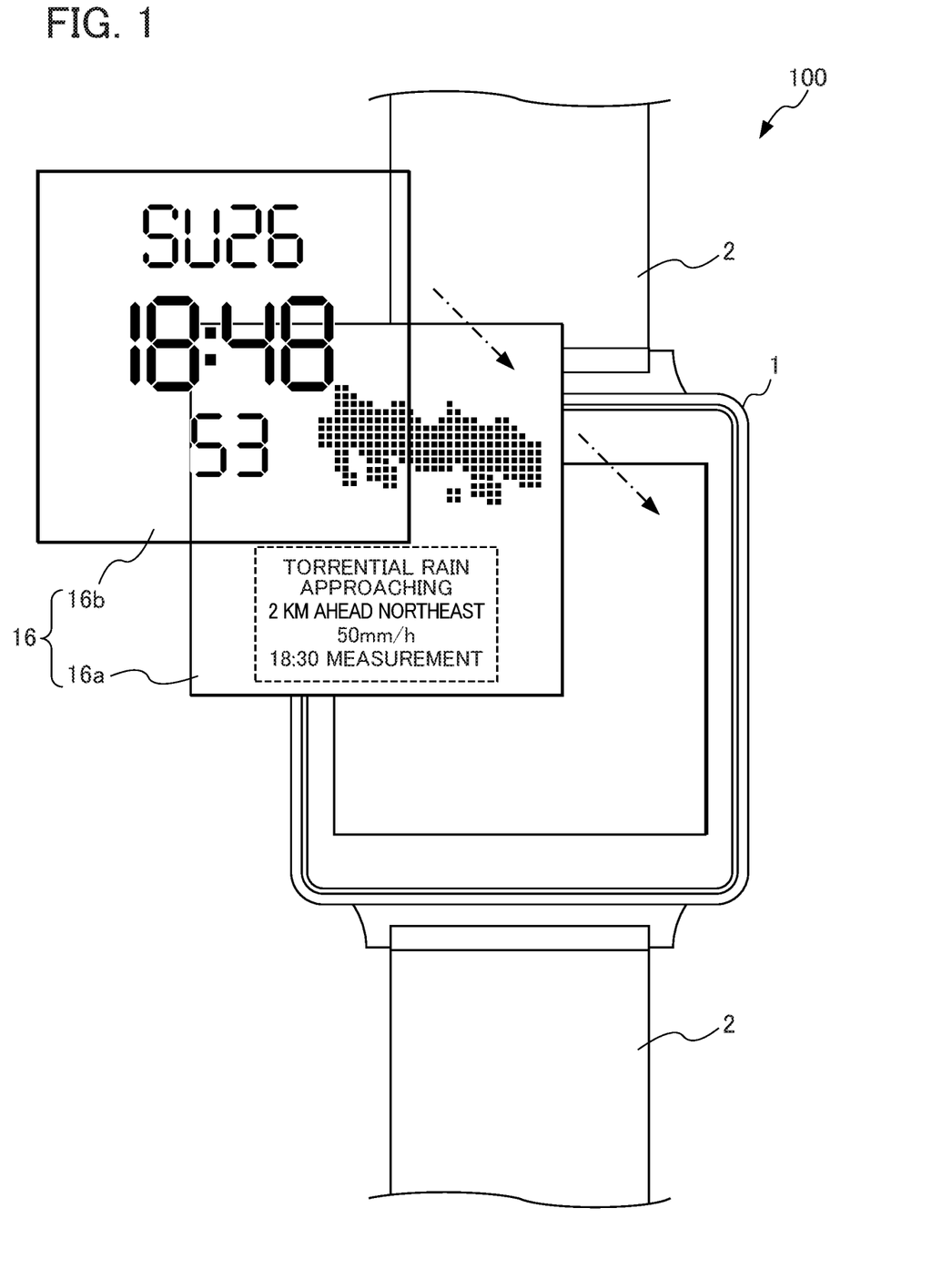
FIG. 1 is an outline drawing of an information processing device that is an embodiment of the present invention.

FIG. 1 is an outline drawing of the information processing device 100, which is one embodiment of the present invention.

As shown in FIG. 1, the information processing device 100 of the present embodiment assumes the form of a wristwatch, and includes a main body 1 and a band part 2.

In addition, the information processing device 100 includes a display unit 16 in the main body 1. This display unit 16 has a first display part 16a and second display part 16b, and more specifically, is formed in a state in which the second display part 16b is stacked on the first display part 16a. For this reason, the display unit 16 is able to display by overlapping the display of the second display part 16b (e.g., time display) over the display of the first display part 16a (e.g., display of weather information). In addition, although omitted from illustration, a touch panel, which is an operation unit 19, is provided on the second display part 16b.

Figure 2:
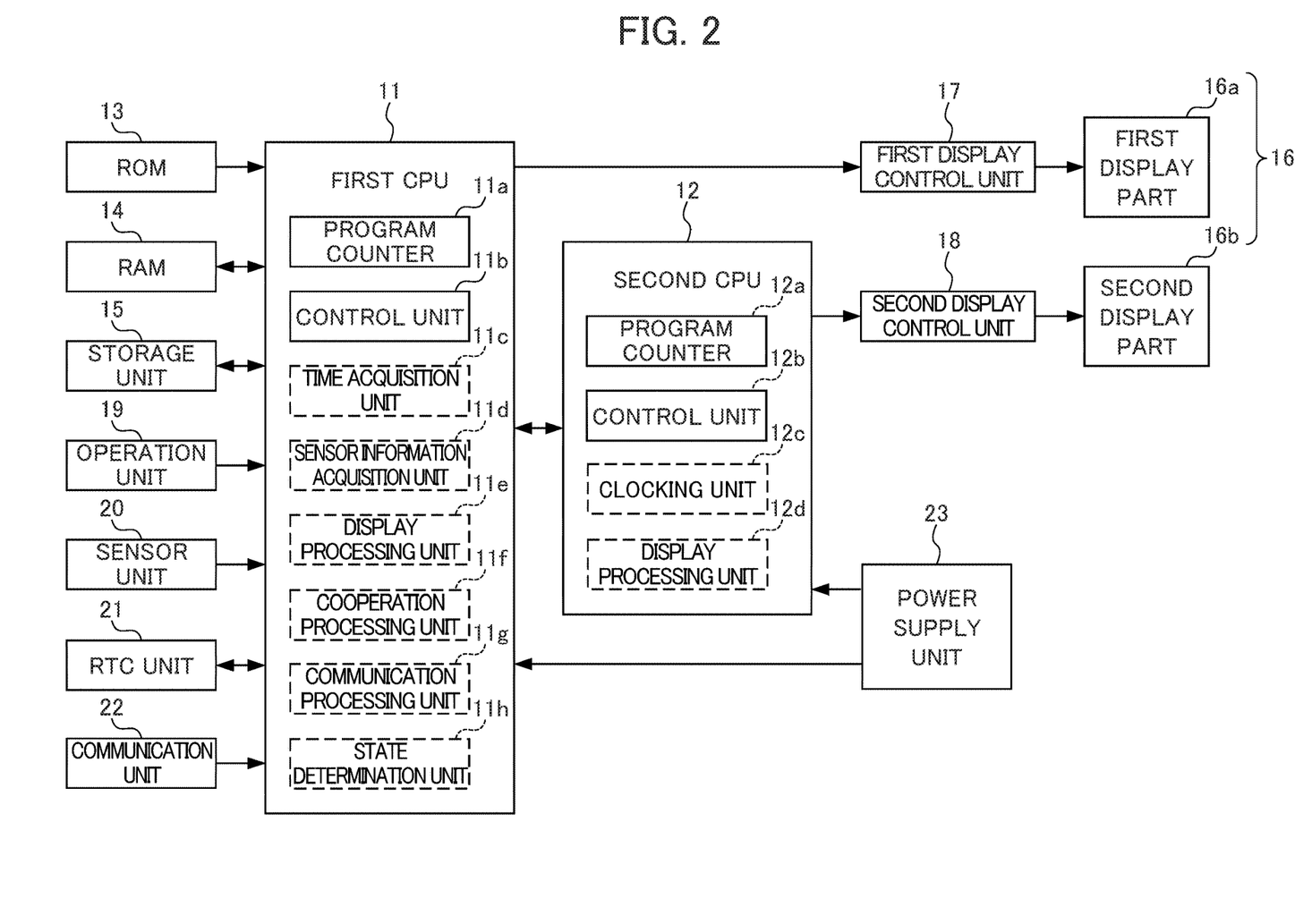
FIG. 2 is a block diagram showing an outline configuration of the information processing device of the present embodiment.

FIG. 2 is a block diagram showing an outline configuration of the information processing device 100 of the present embodiment.

As shown in FIG. 2, the information processing device 100 includes: the first CPU 11, second CPU 12, ROM 13, RAM 14, storage unit 15, display unit 16 (first display part 16a and second display part 16b), first display control unit 17 that controls display of the first display part 16a, second display control unit 18 that controls display of the second display part 16b, operation unit 19, sensor unit 20, Real Time Clock (hereinafter called RTC) unit 21, communication unit 22, power supply unit 23, etc.

The first CPU 11 performs various arithmetic processing, and controls functions similar to a smartphone in the information processing device 100, by executing OS processing (first execution processing). In the present embodiment, the first CPU 11 performs instruction of display control to the first display control unit 17 such as the display of messages related to the arrival of email received via the communication unit 22 and weather information, and also performs processing related to various functions implemented as functions similar to a smartphone. It should be noted that the first CPU 11 can display, on the first display part 16a, display contents similar to the display contents by the function of a wristwatch displayed on the second display part 16b by the second CPU 12.

In addition, in the present embodiment, the first CPU 11 acquires a time signal from the RTC unit 21 at predetermined timings, and outputs the acquired time signal to the second CPU 12. Furthermore, the first CPU 11 performs instructions for display control of time inputted from the second CPU 12 to the first display control unit 17.

It should be noted that the specific configuration of the first CPU 11 will be described later.

The second CPU 12 performs instruction of display control to the second display control unit 18, by executing the processing of a specific program (second execution processing), and also performs processing related to various functions implemented as functions of a wristwatch. In the present embodiment, the second CPU 12 calculates the time based on the time signal inputted from the first CPU 11, and performs instruction of the display control to the second display control unit 18, such as the display of time, weekday or date. In addition, the second CPU 12 is able to acquire the time signal from the RTC unit 21 at predetermined timings directly, without going through the first CPU 11, and in a state in shutting down operation of the OS in the first CPU 11 described later, the second CPU 12 can calculate the time based on the time signal acquired directly from the RTC unit 21. In addition, the second CPU 12 outputs the calculated time to the first CPU 11. The processing of the specific program (second execution processing) executed by the second CPU 12 has low processing load due to being a simple operation compared to the OS processing (first execution processing) executed by the first CPU 11, and is executable with low power consumption. In addition, for this reason, the hardware spec required for the second CPU 12 is sufficient if low compared to the first CPU 11.

It should be noted that the specific configuration of the second CPU 12 will be described later.

The ROM 13 enables the reading of data from each of the first CPU 11 and second CPU 12, and stores various programs executed by the first CPU 11 and second CPU 12, and initial setting data. For example, the ROM 13 stores the OS program executed by the first CPU 11 and various programs executed under OS management, or alternatively, the program of the specific program executed by the second CPU 12 (herein, embedding program for realizing the functions of a wristwatch).

The RAM 14 enables reading and writing of data from each of the first CPU 11 and second CPU 12, provides a working memory space to the first CPU 11 and second CPU 12, and stores temporary data for work. For example, the RAM 14 provides a system area or work area upon the first CPU 11 executing the OS, and provides a storage area upon the second CPU 12 executing a specific program.

The storage unit 15 is non-volatile memory enabling reading and writing of data from each of the first CPU 11 and second CPU 12, and is flash memory or EEPROM (Electrically Erasable and Programmable Read Only Memory), for example. Various data generated for the various functions similar to a smartphone, functions of a wristwatch, etc. (data of various setting contents, etc.) is stored in the storage unit 15.

The display unit 16 includes the first display part 16a and second display part 16b, as mentioned above.

The first display part 16a is configured from a Thin Film Transistor (hereinafter called TFT) color liquid crystal panel having a backlight, and displays various information on the display screen under the control of the first display control unit 17 described later.

The first display control unit 17 performs control to generate data for display and have displayed on the display screen of the first display part 16a.

In the present embodiment, the first display control unit 17, for example, generates display data of a message related to the arrival of email or weather information, following a display instruction from the first CPU 11, for example, and outputs from the first display part 16a.

The second display part 16b is configured from a Polymer Network (hereinafter called PN) liquid crystal panel through which light is partially or completely transmittable, and displays various information on the display screen (segment display herein) under the control of the second control unit 18 described later.

In the present embodiment, the PN liquid crystal panel that is the second display part 16b is stacked on the display screen of the TFT color liquid crystal panel that is the aforementioned first display part 16a, as shown in FIG. 1. This PN liquid crystal panel is configured so that liquid crystal molecules line up irregularly at a site at which electrical potential is not applied, and thus reflects light. In other words, at this site to which electrical potential is not applied, the display is made by the PN liquid crystal panel. On the other hand, at a site to which electrical potential is applied, since the liquid crystal molecules will align perpendicularly relative to the display screen, it will become transmittable to light. In other words, at this site to which electrical potential is applied, since it becomes transmittable to light from the aforementioned TFT color liquid crystal panel, it is possible to visibly recognize the display by this TFT color liquid crystal panel through this PN liquid crystal panel. In other words, with the display unit 16 of the present embodiment, it is made possible to display in a state overlapping the display by the second display part 16b on the display by the first display part 16a.

The second display control unit 18 performs control to generate data for display and have displayed on the display screen of the second display part 16b.

In the present embodiment, the second control unit 18 generates data for display of a time image, and outputs from the second display part 16b, following the display instructions from the second CPU 12, for example.

The operation unit 19 is a capacitance-type touch panel provided on the display screen of the second display part 16b. The operation unit 19 detects a touch operation position of a user on the touch panel and the operation contents, causes a signal corresponding to this operation to be generated, and outputs to the first CPU 11 as an input signal.

The sensor unit 20 includes various sensors such as a geomagnetism sensor, gyro sensor, three-axis acceleration sensor, pressure sensor, temperature sensor or a position sensor employing GPS (Global Positioning System) or the like. In the present embodiment, the detection signals of the sensor unit 20 are outputted to the first CPU 11. It should be noted that it may be configured to output the detection signals of the sensor unit 20 also to the second CPU 12, and display information based on the detection signals from these sensors, as a part of the function of the wristwatch.

The RTC unit 21 includes an oscillating element such as a crystal oscillator, and counts the time continuously, by the supply of electric power from the power supply unit 23 or the supply of electric power from an auxiliary power source (primary battery, etc.), even while the power source of the information processing device 100 is not turned ON. In the present embodiment, the RTC unit 21 outputs a time signal indicating the counted time to the first CPU 11. It should be noted that it may be configured to output the time signal of the RTC unit 21 also to the second CPU 12.

The communication unit 22 includes a wireless communication function such as Bluetooth (registered trademark), BLE (Bluetooth Low Energy) (registered trademark), or alternatively, Wi-Fi (Wireless Fidelity) (registered trademark), and performs communication with other electronic devices (smartphone, etc.).

The power supply unit 23 supplies electric power related to the operation of the information processing device 100 at a predetermined voltage. The power supply unit 23, for example, possesses any kind of battery (lithium battery, nickel-hydride rechargeable battery, etc.). In the present embodiment, the first CPU 11 and second CPU 12 are supplied electric power from the power supply unit 23.

In addition, the power supply unit 23 detects the remaining battery power, and outputs a signal indicating the detected remaining battery power to the first CPU 11.

Next, the specific configurations of the first CPU 11 and second CPU 12 will be explained.

As shown in FIG. 2, the first CPU 11 includes a program counter 11a and control unit 11b as hardware configurations. In addition, the first CPU 11 constitutes a time acquisition unit 11c, sensor information acquisition unit 11d, display processing unit 11e, cooperation processing unit 11f, communication processing unit 11g, and state determination unit 11h, by executing the OS program or various programs (operation management processing, etc. described later).

The program counter 11a is a register included inside of the first CPU 11, and stores the address in the ROM 13 at which a program to be executed next is stored.

The control unit 11b manages the operations for executing programs in the first CPU 11, such as the operation timing and operation contents in each part inside the first CPU 11 (decoding circuit, arithmetic circuit, etc. not illustrated). In addition, the control unit 11b successively writes, in the program counter 11a, the address in the ROM 13 at which the program to be executed next is stored.

The time acquisition unit 11c acquires the time signal at a predetermined timing (e.g., startup time, when adjusting time, etc.) from the RTC unit 21. Then, the time acquisition unit 11c outputs the acquired time signal to the second CPU 12. In addition, the time acquisition unit 11c acquires the time calculated and outputted by the second CPU 12.

The sensor information acquisition unit 11d acquires the detection signals of various sensors equipped to the sensor unit 20.

The display processing unit 11e outputs an instruction signal for display control to display the information acquired by each functional unit and processing results to the first display control unit 17.

The cooperation processing unit 11f performs processing related to cooperation between the first CPU 11 and second CPU 12. More specifically, in the case of the processing by the first CPU 11 and processing by the second CPU 12 having a correlation, the cooperation processing unit 11f performs processing causing one among the first CPU 11 and second CPU 12 to handle the operations of the other. For example, upon the display by the first display part 16a and the display by the second display part 16b being switched, the cooperation processing unit 11f allows instruction for display control performed by the first CPU 11 and second CPU 12 to be handled so that the same information is temporarily displayed to be superimposed on the first display part 16a and second display part 16b.

The communication processing unit 11g outputs information received via the communication unit 22 to each functional unit according to this information, and sends information to be sent from each functional unit to other electronic devices via the communication unit 2. For example, in the case of receiving information notifying of the arrival of email from another electric device (paired smartphone, etc.) via the communication unit 22, the communication processing unit 11g outputs the received information to the display processing unit 11e.

The state determination unit 11h determines various state of the information processing device 100, and performs processing according to the determination results. For example, the state determination unit 11h determines the usage state of the information processing device 100, based on the detection signals of the gyro sensor and three-axis acceleration sensor acquired by the sensor information acquisition unit 11d, such as the information processing device 100 being still (state of user being still or state not being worn on arm of user), entering a posture in the case of the user holding up an arm and viewing the information processing device 100, or arm swinging of the user being detected (action swinging the arm during travel or walking). Then, in the case of determining that the information processing device 100 is a usage state not viewed by the user, such as the information processing device 100 being still, being a posture in the case of the user viewing the information processing device 100, and the user performing an operation lowering the arm, or user arm swing being detected, the state determination unit 11h shuts down and stops operation of the OS in the first CPU 11 (i.e. stops electrical power supply to the first CPU 11), and switches to a state performing time display of the second CPU 12 (i.e. state only allowing the function of a wristwatch to work). It should be noted that these usage states, for example, can be determined by storing signal patterns of the gyro sensor and three-axis acceleration sensor corresponding to each operation in the storage unit 15, and performing matching with the detected signal pattern.

In addition, the state determination unit 11*h* determines whether the remaining battery power is less than a threshold set in advance, based on a signal indicating the remaining battery power inputted from the power supply unit 23. Then, the state determination unit 11*h* shuts down and stops operation of the OS in the first CPU 11, and switches to the state performing time display of the second CPU 12, in the case of determining that the remaining battery power is less than the threshold set in advance.

According to such processing, in a case of the user not viewing the display screen of the information processing device 100 or a case of the remaining battery power of the information processing device 100 being little, it is possible to stop the functions similar to a smartphone of the information processing device 100, and allow only the function of a wristwatch to operate. For this reason, it becomes possible to cause the information processing device 100 to operation as a wristwatch with lower power consumption.

It should be noted that, other than in the case of the state determination unit 11*h* performing the above-mentioned determinations, it may be configured so that the state determination unit 11*h* stops the functions similar to a smartphone of the information processing device 100 and only causes the function of the wristwatch to operate, in the case of an instruction to stop the functions similar to a smartphone being inputted by a user.

In addition, as shown in FIG. 2, the second CPU 12 includes a program counter 12*a* and control unit 12*b* as hardware configurations. Furthermore, the second CPU 12 constitutes a clocking unit 12*c* and display processing unit 12*d*, by executing predetermined programs.

The program counter 12*a* is a register equipped inside of the second CPU 12, and stores the address of the ROM 13 at which the program to be executed next is stored.

The control unit 12*b* manages the operations for executing programs in the second CPU 12, such as the operation timing and operation contents for each part in the second CPU 12 (decoding circuit, arithmetic circuit, etc. not illustrated). In addition, the control unit 12*b* successively writes the addresses of the ROM 13 at which the programs to be executed next are stored in the program counter 12*a*.

The clocking unit 12*c* calculates the time based on the time signal inputted from the first CPU 11. Then, the clocking unit 12*c* outputs the calculated time to the first CPU 11.

In addition, the second CPU 12 can acquire the time signal at a predetermined timing directly from the RTC unit 21, without going through the first CPU 11, and calculate the time in the clocking unit 12*c* based on the acquired time signal.

The display processing unit 12*d* outputs an instruction signal for display control to display the processing results of the clocking unit 12*c* to the second display control unit 18.
(Operation)

Next, the operation will be explained.

Figure 3:
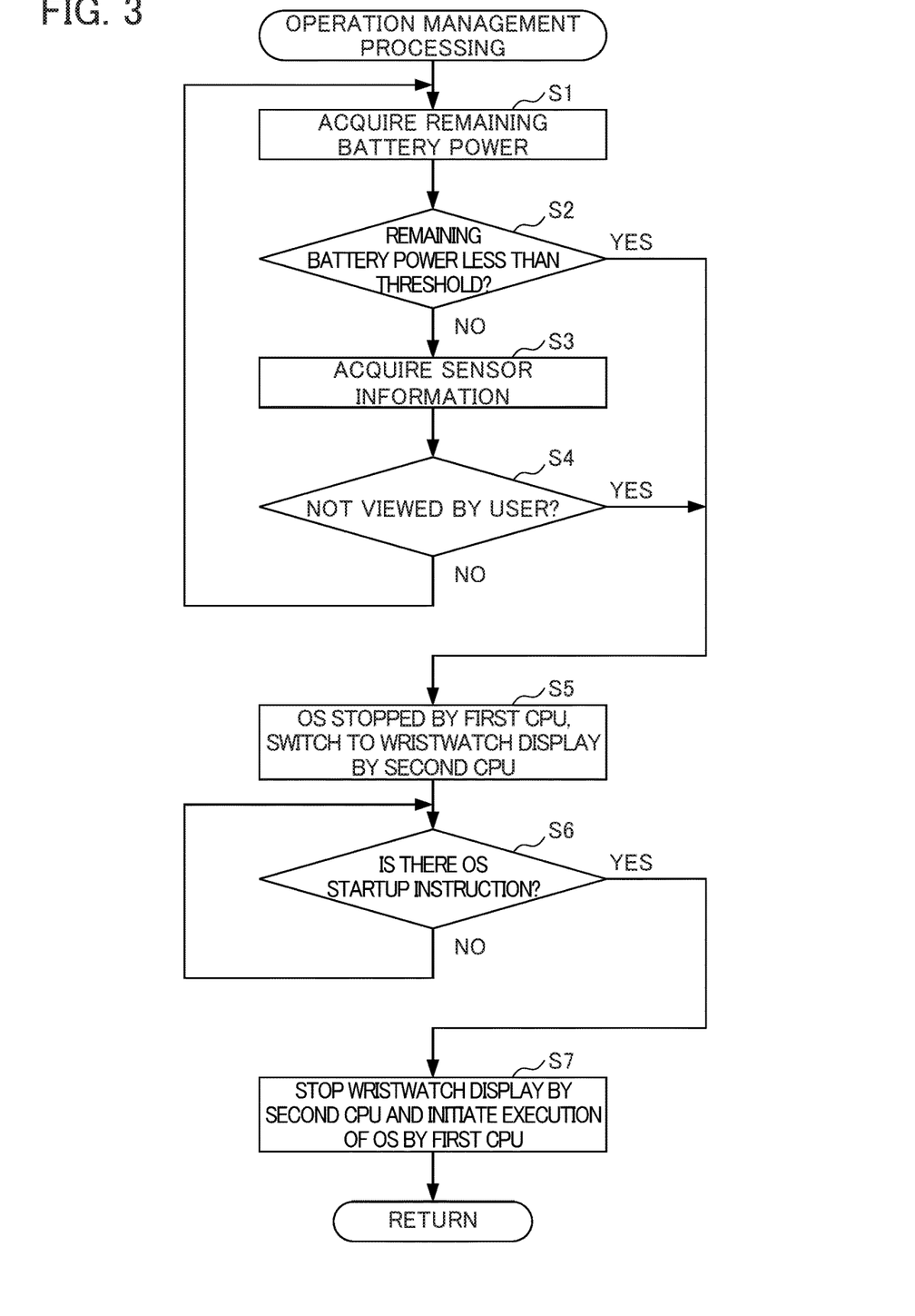
FIG. 3 is a flowchart illustrating the flow of operation management processing executed by an information processing device.

FIG. 3 is a flowchart illustrating the flow of operation management processing executed by the information processing device 100.

Figure 4A:
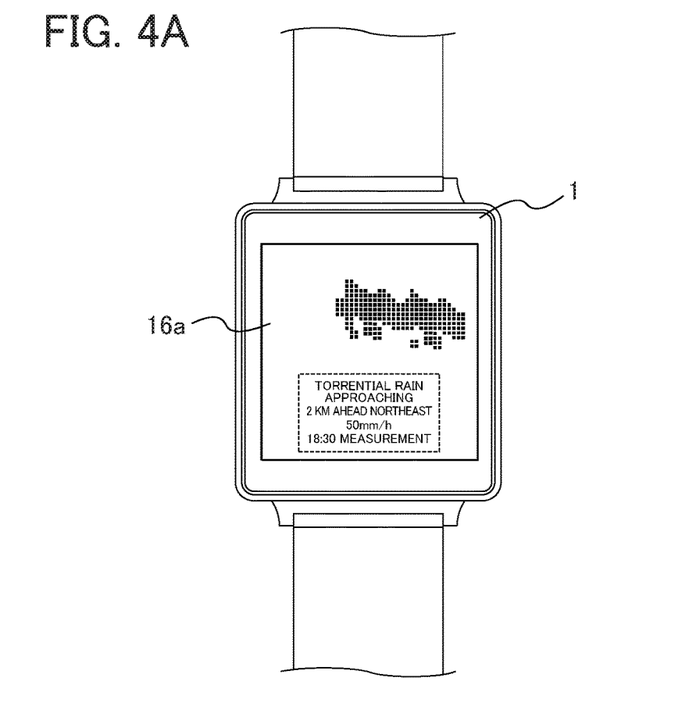
FIG. 4A is a schematic diagram showing a display screen example of the information processing device upon the operation management processing being executed, and is a view showing a state in which a display screen is displayed according to OS processing on a first display unit.
Figure 4B:
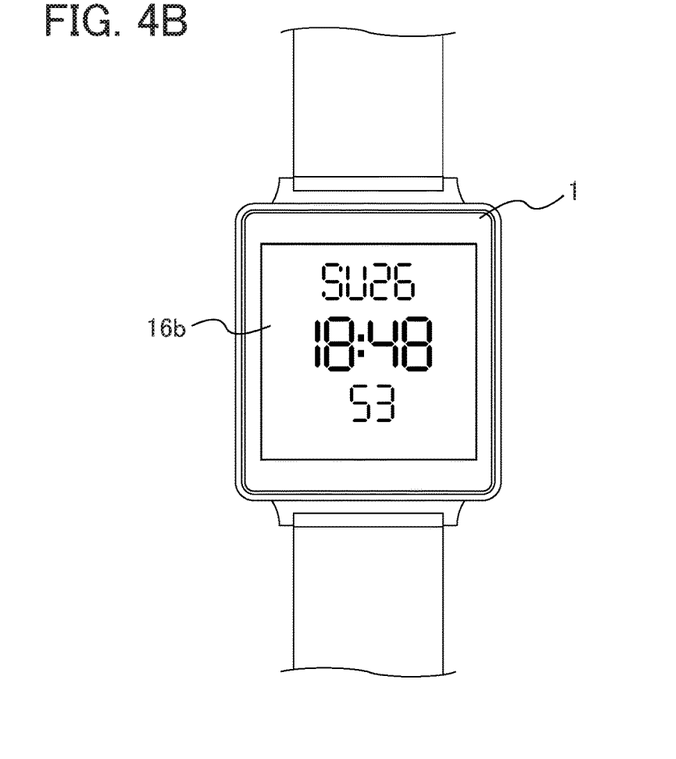
FIG. 4B is a schematic diagram showing a display screen example of the information processing device upon the operation management processing being executed, and is a view showing a state in which a display screen is displayed according to predetermined program processing on a second display unit.

In addition, FIGS. 4A and 4B are schematic drawings showing display screen examples of the information processing device 100 upon the operation management processing being executed, with FIG. 4A being a view showing a state in which the display screen is displayed according to OS processing on the first display part 16*a*, and FIG. 4B being a view showing a state in which the display screen is displayed according to processing of a specific program on the second display part 16*b*.

Hereinafter, the operation management processing shown in FIG. 3 will be explained while referencing FIGS. 4A and 4B as appropriate.

The operation management processing is initiated accompanying power source activation of the information processing device 100, and is repeatedly executed until the power source of the information processing device 100 is turned OFF.

Upon initiation of the operation management processing, the first CPU 11 enters a state executing the OS processing, and the display screen shown in FIG. 4A (screen displaying the movement of rain clouds and a message related to weather information), for example, is displayed on the first display part 16*a*.

In Step S1, the state determination unit 11*h* acquires the remaining battery power based on the signal indicating the remaining battery power inputted from the power supply unit 23.

In Step S2, the state determination unit 11*h* determines whether the remaining battery power is less than the threshold set in advance.

In the case of the remaining battery power not being less than the threshold set in advance, it is determined as NO in Step S2, and the processing advances to Step S3.

On the other hand, in the case of the remaining battery power being less than the threshold set in advance, it is determined as YES in Step S2, and the processing advances to Step S5.

In Step S3, the sensor information acquisition unit 11*d* acquires the detection signals of various sensors equipped to the sensor unit 20.

In Step S4, the state determination unit 11*h* determines whether the state of the information processing device 100 is a usage state not being viewed by the user, based on the detection signals of the various sensors (gyro sensor, three-axis acceleration sensor, or the like) acquired by the sense information acquisition unit 11*d*. More specifically, states are determined such as the information processing device 100 being still (state not being worn on the arm of the user), entering a posture in the case of the user holding up an arm and viewing the information processing device 100, the user performing an action lowering the arm, and user arm swinging (action swinging the arm during travel or walking) being detected.

In the case of being a usage state in which the information processing device 100 is not being viewed by the user, it is determined as YES in Step S4, and the processing advances to Step S5.

In the case of not being a usage state in which the information processing device 100 is not being viewed by the user, it is determined as NO in Step S4, and the processing advances to Step S1.

In Step S5, the state determination unit 11*h* shuts down and stops the OS operation in the first CPU 11, and switches to a state performing the time display of the second CPU 12 (i.e. state allowing only the function of wristwatch to operate). The display screen shown in FIG. 4B (screen displaying time as wristwatch), for example, is thereby displayed on the second display part 16*b*. Subsequently, the second CPU 12 continuously executes the function as the wristwatch (time display).

In Step S6, the control unit 12b of the second CPU 12 performs determination of whether startup of the OS was instructed by the user (i.e. whether startup of the first CPU 11 was instructed).

In the case of startup of the OS being instructed by the user, it is determined as YES in Step S6, and the processing advances to Step S7.

In a case of OS startup not being instructed by the user, it is determined as NO in Step S6, and the processing of Step S6 is repeated.

In Step S7, the control unit 11b of the first CPU 11 stops the time display of the second CPU 12, and executes the startup sequence of the first CPU 11 to transition to a state executing the OS.

After Step S7, the operation management processing is repeated.

It should be noted that, although not illustrated in the flowchart of FIG. 3, only in a case of an instruction to stop the functions similar to a smartphone being inputted by the user, it may shutdown and stop OS operation in the first CPU 11, and switch to a state performing time display of the second CPU 12 (i.e. state allowing only the function of a wristwatch to operate).

By way of such processing, it is possible to stop the functions similar to a smartphone of the information processing device 100 and allow only the function of a wristwatch to operate, in a case of the user not viewing the display screen of the information processing device 100, or in a case of the remaining battery power of the information processing device 100 being low.

For this reason, it becomes possible to cause the information processing device 100 to function as a wristwatch with lower power consumption.

In other words, it is possible to make a wearable information processing device to be lower power consumption.

It should be noted that, in the present embodiment, it may be configured so that electrical power supply to the second CPU 12 is stopped in a state in which the first CPU 11 is executing the OS processing, and electrical power supply to the second CPU 12 is performed upon shutting down and stopping OS operation in the first CPU 11, and switching to a state performing time display of the second CPU 12.

Modified Example

Figure 5:
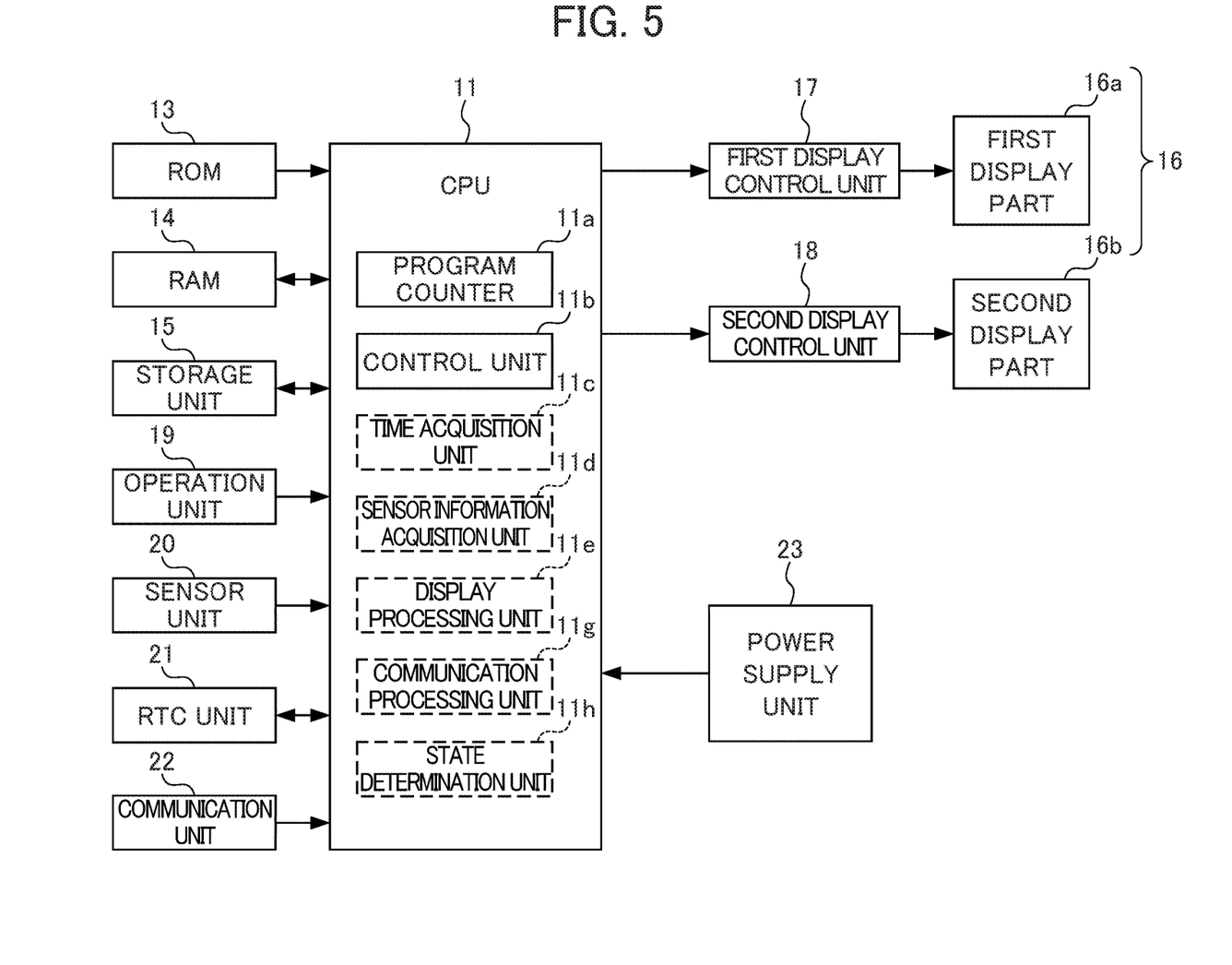
FIG. 5 is a block diagram showing an outline configuration of an information processing device of a modified example.

FIG. 5 is a block diagram showing an outline configuration of an information processing device of a modified example.

In the aforementioned embodiment, the information processing device 100 is configured to include the two CPUs of the first CPU 11 and second CPU 12.

In contrast, it is also possible to apply the present invention in a case of the information processing device 100 including the one CPU 11.

In this case, a configuration capable of executing the OS and specific program by the one CPU 11 is established, and in a state executing the OS, by causing interruption processing that switches to the processing of the specific program to occur, the OS operation is stopped and the specific program is allowed to operate. More specifically, the interruption processing program stops the OS causes the specific program to execute, by overwriting the value of the program counter in the CPU 11 at the switching moment (interruption generation moment) with the starting address of the specific program.

It is thereby possible to stop the functions similar to a smartphone of the information processing device 100, and allow only the function of a wristwatch to operate with the operation of one processor.

For this reason, it becomes possible to cause the information processing device 100 to function as a wristwatch with lower power consumption.

In other words, it is possible to make a wearable information processing device to be lower power consumption.

It should be noted that the present invention is not to be limited to the aforementioned embodiments, and that modifications, improvements, etc. in a scope that can achieve the objects of the present invention are also matters included in the present invention.

For example, hardware that is controllable by the first CPU 11 and hardware that is controllable by the second CPU 12 can be various different types according to the usage form mainly assumed of the information processing device 100, in addition to the examples shown in the aforementioned embodiments.

In addition, the hardware that is equipped other than to the first CPU 11 and second CPU 12 may be different from the examples shown in the aforementioned embodiments. For example, according to the memory volume required in the processing assumed in each of the first CPU 11 and second CPU 12, it may be configured so as to include each of RAM for the processing of the first CPU 11 and RAM for the processing of the second CPU 12, and stop the operation of the RAM for the processing of the first CPU 11 along with stopping the operation of the first CPU 11. It is thereby possible to reduce the electric power driving the RAM used only in the processing of the first CPU 11, and possible to make the information processing device 100 lower power consumption.

In addition, although the aforementioned embodiment is explained giving the case of the information processing device 100 including the two CPUs of the first CPU 11 and second CPU 12 as an example, it is also possible to set the number of CPUs possessed by the information processing device 100 as three or more. For example, it may be configured to allow the OS to operate with two or more CPUs.

In addition, although the aforementioned embodiments are explained giving a case of shutting down the OS as the mode of stopping OS operation in the first CPU 11 as an example, the mode for stopping OS operation is not limited thereto. For example, it may be configured to stop the functions operating under the management of the OS, while establishing a state in which the OS is starting up, as the mode of stopping the OS operation. As one example, it may be configured so as to stop the display function by way of the first display part 16a, while the OS establishes a startup state. In this case, regarding hardware, it is possible to stop the functions of the first display part 16a and first display control unit 17.

It is thereby possible to achieve lowering of power consumption of the information processing device 100, while shorting the time required to restart OS operation.

In addition, in the aforementioned embodiments, the functions of the specific program executed by the second CPU 12 can be established as the minimum functions that can realize the function as a clock. For example, it is possible to establish a function for updating the time display on the second display part 16b by acquiring a time signal (current time) from the RTC unit 21 every predetermined time period, such as every 1 second or 1 minute, or by counting the time of the second CPU 12.

It is thereby possible to make the processing of the specific program executed by the second CPU 12 to have lower processing load, and thus possible to further reduce the power consumption of the information processing device 100.

In addition, in the aforementioned embodiments, the information processing device 100 to which the present invention is applied is explained with the example of a wearable information processing device; however, it is not particularly limited thereto.

For example, the present invention can be applied to general use electronic devices having an information processing function. More specifically, for example, the present invention is applicable to notebook-type personal computers, printers, television sets, video cameras, portable navigation devices, portable telephones, smartphones, portable game devices, etc.

In addition, in the aforementioned embodiments, the second display part 16b is explained as being a PN liquid crystal panel; however, it is not limited thereto. The second display part 16b may be a display device that becomes a state transmitting light in response to electric potential applied to the liquid crystal and, for example, it is possible to use a transmission-type display device other than PN type such as a polymer dispersed (PD) liquid crystal panel, organic electro-luminescence (hereinafter called EL) panel, inorganic EL panel, and TFT liquid crystal panel.

In addition, although the aforementioned embodiment is explained with the second display part 16b as stacked on the display screen of the first display part 16a, it is not limited thereto. In other words, by configuring the first display part 16a with a transmission-type display device, it is possible to also stack the first display part 16a on the display screen of the second display part 16b.

The aforementioned series of processing can also be executed by hardware, or can be executed by software. In other words, the functional configuration in FIG. 2 is merely an exemplification, and is not particularly limited thereto.

In other words, it is sufficient so long as functions enabling the aforementioned series of processing to be executed in entirety are provided to the information processing device 100, and what kinds of functional blocks are used for realizing these functions are not particularly limited to the example of FIG. 2.

In addition, one functional block may be configured by one piece of hardware, may be configured by one installation of software, or may be configured by a combination of these.

In the case of having the series of processing executed by software, the program constituting this software is installed from a network or recording medium to a computer or the like.

The computer may be a computer equipped with dedicated hardware. In addition, the computer may be a computer capable of executing various functions, e.g., a general purpose personal computer, by installing various programs.

The storage medium containing such a program can not only be constituted by the removable medium distributed separately from the device main body for supplying the program to a user, but also can be constituted by a storage medium or the like supplied to the user in a state incorporated in the device main body in advance. The removable medium is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 13 of FIG. 2 in which the program is recorded or a hard disk, etc. included in the storage unit 15 of FIG. 2.

It should be noted that, in the present specification, the steps defining the program recorded in the storage medium include not only the processing executed in a time series following this order, but also processing executed in parallel or individually, which is not necessarily executed in a time series.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An information processing device comprising:
a first display comprising first display circuitry;
a second display comprising second display circuitry distinct from the first display circuitry, wherein the second display is laminated on a top layer of the first display and transmits light by applying electric potential;
a first CPU; and
a second CPU;
wherein the information processing device is configured to perform:
first execution processing, by the first CPU, of executing a first clock function by way of an operating system; and
second execution processing, by the second CPU, of executing a second clock function by way of a specific program which is different from the operating system,
wherein:
the first display is controlled by the first execution processing performed by the first CPU, the second display is controlled by the second execution processing performed by the second CPU, and the second execution processing displays current time by way of the second clock function on the second display in a state in which operation of the operating system is stopped,
during display of current time by way of the first clock function on the first display according to the first execution processing, the second execution processing applies electric potential to the second display to set the second display to a transmitting state, thereby making display by the first display visually recognizable,
the information processing device further comprises a cooperation processing unit that performs processing causing one of the first CPU and the second CPU to process display control instructions of the other of the first CPU and the second CPU during a switching state in which display by the first display and display by the second display are being switched, and
during the switching state, the cooperation processing unit causes said one of the first CPU and the second CPU to control both the first display and the second display to actively display the same information at corresponding overlapping positions on the first display and the second display.

2. The information processing device according to claim 1, wherein the second execution processing consumes less power than the first execution processing.

3. The information processing device according to claim 1, wherein the information processing device is further configured to perform switching processing that executes a state determination of the information processing device, and switches between the first execution processing and the second execution processing based on a result of the state determination.

4. The information processing device according to claim 3,
wherein the information processing device operates by battery,
wherein the state determination is a remaining battery power determination of the battery of the information processing device, and
wherein the switching processing switches to the first execution processing when the remaining battery power is at least a predetermined value, and switches to the second execution processing when the remaining battery power is less than the predetermined value.

5. The information processing device according to claim 3,
wherein the state determination is an operation state determination of a user holding the information processing device, and
wherein the switching processing switches between the first execution processing and the second execution processing based on a result of the operation state determination.

6. The information processing device according to claim 5, wherein the switching processing switches to the first execution processing when the operation state determination determines that the user remains still, and switches to the second execution processing when the operation state determination determines that the user does not remain still.

7. The information processing device according to claim 5, wherein the switching processing switches to the first execution processing when the operation state determination determines that the user is viewing the information processing device, and switches to the second execution processing when the operation state determination determines that the user is not viewing the information processing device.

8. The information processing device according to claim 1,
wherein the information processing device performs data communication with an external device, and
wherein the first execution processing further conducts data processing on data received from the external device.

9. The information processing device according to claim 8, wherein the data processing notifies the user of the data received from the external device.

10. The information processing device according to claim 9, wherein the first execution processing notifies the user of the data received from the external device by displaying the data on the first display.

11. The information processing device according to claim 1, wherein the second display comprises a PN (Polymer Network) liquid crystal display unit of a segment display.

12. The information processing device according to claim 1, wherein the information processing device stops operations of the operating system by stopping electrical power supply to the first CPU.

13. The information processing device according to claim 1, wherein power consumption of the second CPU is lower than power consumption of the first CPU.

14. The information processing device according to claim 1,
wherein, in response to a processing state change in which a processing state of the information processing device enters a correlated state in which processing by the first CPU and the processing by the second CPU have a correlation, the cooperation processing unit performs processing causing one of the first CPU and the second CPU to process instructions of the other of the first CPU and the second CPU, and
wherein the correlated state includes the switching state.

15. The information processing device according to claim 1,
wherein, in response to a processing state change in which a processing state of the information processing device enters a correlated state in which processing by the first CPU for controlling the first display and the processing by the second CPU for controlling the second display have a correlation, the cooperation processing unit performs processing causing one of the first CPU and the second CPU to process the display control instructions of the other of the first CPU and the second CPU such that said one of the first CPU and the second CPU controls both the first display and the second display and such that the other of the first CPU and the second CPU does not handle instructions for controlling the first display and the second display, and
wherein the correlated state includes the switching state.

16. A method of controlling an information processing device that includes a first display comprising first display circuitry, a second display comprising second display circuitry distinct from the first display circuitry, wherein the second display is laminated on a top layer of the first display and transmits light by applying electric potential, a first CPU, and a second CPU, the method comprising:
first execution processing, by the first CPU, of executing a first clock function by way of an operating system; and
second execution processing, by the second CPU, of executing a second clock function by way of a specific program which is different from the operating system, wherein:
the first display is controlled by the first execution processing performed by the first CPU, the second display is controlled by the second execution processing performed by the second CPU, and the second execution processing displays current time by way of the second clock function on the second display in a state in which operation of the operating system is stopped, and
during display of current time by way of the first clock function on the first display according to the first execution processing, the second execution processing applies electric potential to the second display to set the second display to a transmitting state, thereby making display by the first display visually recognizable,
the information processing device further comprises a cooperation processing unit,
the method further comprises cooperation processing, by the cooperation processing unit, that causes one of the first CPU and the second CPU to process display control instructions of the other of the first CPU and the second CPU during a switching state in which display by the first display and display by the second display are being switched, and during the switching state, the cooperation processing causes said one of the first CPU and the second CPU to control both the first display and the second display to actively display the same information at corresponding overlapping positions on the first display and the second display.

17. The method according to claim 16,
wherein the method further comprises:
in response to a processing state change in which a processing state of the information processing device enters a correlated state in which processing by the first CPU and the processing by the second CPU have a correlation, cooperation processing, by the cooperation processing unit, that causes one of the first CPU and the second CPU to process instructions of the other of the first CPU and the second CPU, and
wherein the correlated state includes the switching state.

18. The method according to claim 16,
wherein the method further comprises:
in response to a processing state change in which a processing state of the information processing device enters a correlated state in which processing by the first CPU for controlling the first display and the processing by the second CPU for controlling the second display have a correlation, cooperation processing, by the cooperation processing unit, that causes one of the first CPU and the second CPU to process the display control instructions of the other of the first CPU and the second CPU such that said one of the first CPU and the second CPU controls both the first display and the second display and such that the other of the first CPU and the second CPU does not handle instructions for controlling the first display and the second display, and
wherein the correlated state includes the switching state.

19. A non-transitory computer readable medium having stored thereon a program executable by a computer of an information processing device that further includes a first display comprising first display circuitry and a second display comprising second display circuitry distinct from the first display circuitry, wherein the second display is laminated on a top layer of the first display and transmits light by applying electric potential, the computer comprising a first CPU, and a second CPU, the program causing the computer to execute:
first execution processing, by the first CPU, of executing a first clock function by way of an operating system; and
second execution processing, by the second CPU, of executing a second clock function by way of a specific program which is different from the operating system, wherein:
the first display is controlled by the first execution processing performed by the first CPU, the second display is controlled by the second execution processing performed by the second CPU, and the second execution processing displays current time by way of the second clock function on the second display in a state in which operation of the operating system is stopped,
during display of current time by way of the first clock function on the first display according to the first execution processing, the second execution processing applies electric potential to the second display to set the second display to a transmitting state, thereby making display by the first display visually recognizable,
the information processing device further comprises a cooperation processing unit,
the program further causes the computer to execute cooperation processing, by the cooperation processing unit, that causes one of the first CPU and the second CPU to process display control instructions of the other of the first CPU and the second CPU during a switching state in which display by the first display and display by the second display are being switched, and
during the switching state, the cooperation processing causes said one of the first CPU and the second CPU to control both the first display and the second display to actively display the same information at corresponding overlapping positions on the first display and the second display.

20. The non-transitory computer readable medium according to claim 19,
wherein the program further causes the computer to execute:
in response to a processing state change in which a processing state of the information processing device enters a correlated state in which processing by the first CPU for controlling the first display and the processing by the second CPU for controlling the second display have a correlation, cooperation processing, by the cooperation processing unit, that causes one of the first CPU and the second CPU to process the display control instructions of the other of the first CPU and the second CPU such that said one of the first CPU and the second CPU controls both the first display and the second display and such that the other of the first CPU and the second CPU does not handle instructions for controlling the first display and the second display, and
wherein the correlated state includes the switching state.

* * * * *